US008413117B1

(12) United States Patent
Coughlan et al.

(10) Patent No.: US 8,413,117 B1
(45) Date of Patent: Apr. 2, 2013

(54) SYSTEMS AND METHODS FOR FOCUSING PRODUCT TESTING BASED ON AREAS OF CHANGE WITHIN THE PRODUCT BETWEEN PRODUCT BUILDS

(75) Inventors: Martin Coughlan, Sandyford (IE); Janick Deregnieaux, Saint Cyprien (FR); Robert Leyden, Clonsilla (IE); Sebastian Nowak, Tyrellstown (IE); Martin Roche, Clonee (IE)

(73) Assignee: Symantec Corporation, Mountain View, CA (US)

( * ) Notice: Subject to any disclaimer, the term of this patent is extended or adjusted under 35 U.S.C. 154(b) by 839 days.

(21) Appl. No.: 12/537,378

(22) Filed: Aug. 7, 2009

(51) Int. Cl.
G06F 9/44 (2006.01)
(52) U.S. Cl. ........ 717/124; 717/125; 717/126; 717/139; 714/38.1; 714/715; 714/819; 714/36
(58) Field of Classification Search .................. 717/124; 714/38.1, 36
See application file for complete search history.

(56) References Cited

U.S. PATENT DOCUMENTS

| | | | | |
|---|---|---|---|---|
| 5,872,956 A * | 2/1999 | Beal et al. | ...................... | 709/224 |
| 5,895,494 A * | 4/1999 | Scalzi et al. | .................. | 711/150 |
| 5,960,196 A * | 9/1999 | Carrier et al. | ................. | 717/122 |
| 6,066,182 A * | 5/2000 | Wilde et al. | .................... | 717/175 |
| 6,167,568 A * | 12/2000 | Gandel et al. | ................. | 717/176 |
| 6,802,055 B2 * | 10/2004 | Jade et al. | ..................... | 717/130 |
| 7,043,715 B1 * | 5/2006 | Bauer et al. | .................... | 717/107 |
| 7,089,141 B2 * | 8/2006 | Schmit | ........................... | 702/123 |
| 7,240,288 B2 * | 7/2007 | Allor et al. | ..................... | 715/736 |
| 7,624,394 B1 * | 11/2009 | Christopher, Jr. | ............. | 717/177 |
| 7,694,082 B2 * | 4/2010 | Golding et al. | ............... | 711/154 |
| 8,069,433 B2 * | 11/2011 | Parsell et al. | .................. | 717/103 |
| 2005/0193268 A1 * | 9/2005 | Allor et al. | ...................... | 714/38 |
| 2006/0156137 A1 * | 7/2006 | Raul et al. | ..................... | 714/738 |
| 2007/0028217 A1 * | 2/2007 | Mishra et al. | ................. | 717/124 |
| 2008/0040706 A1 * | 2/2008 | Blancha et al. | ............... | 717/124 |
| 2008/0040709 A1 * | 2/2008 | Blancha et al. | ............... | 717/130 |
| 2008/0172659 A1 * | 7/2008 | Yu et al. | ........................ | 717/139 |
| 2009/0064158 A1 * | 3/2009 | Carter | ........................... | 718/104 |
| 2010/0042929 A1 * | 2/2010 | Berry et al. | .................... | 715/738 |

OTHER PUBLICATIONS

Title: Resource allocation and test scheduling for concurrent test of core-based SOC design, author: Yu Huang et al, source: IEEE, dated: 2001.*
Title: An Optimizing algorith for Resources Allocation in Parallel Test, author: Dexin Zhou et al, source: IEEE, dated:2009.*

* cited by examiner

*Primary Examiner* — Chameli Das
(74) *Attorney, Agent, or Firm* — Holland & Hart LLP

(57) ABSTRACT

A computer-implemented method for focusing product testing based on areas of change within the product is described. A link between resource files of a product and test cases associated with the product is created. The resource files of a first build of the product are compared with the resource files of a second build of the product. A report that comprises which resource files changed between the first build of the product and the second build of the product is generated. The resource files that have changed and the test cases linked to the changed resource files are displayed. The test cases linked to the changed resource files are executed.

20 Claims, 8 Drawing Sheets

SYSTEMS AND METHODS FOR FOCUSING PRODUCT TESTING BASED ON AREAS OF CHANGE WITHIN THE PRODUCT BETWEEN PRODUCT BUILDS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Computer technologies used by consumers and by the business world continue to demand that the efficiency of these technologies increase. These demands have included demands to improve software that may be implemented on a computer system. Software includes instructions for a computer system. The computer system typically requires software to function. Instructions within a software program are usually executed in a central processor the computer system.

The development of these computer software programs is a time consuming and expensive task. In addition, the testing of the software programs is also an expensive process that might require a large number of resources. Inefficient testing procedures could delay the development and refinement of a software program. As a result, benefits may be realized by providing systems and methods for focusing the testing of a product (such as a computer software program) on certain areas of the program. In particular, benefits may be realized by providing systems and methods for focusing product testing on the areas of change within the product between product builds.

SUMMARY

According to at least one embodiment, a computer-implemented method for focusing product testing based on areas of change within the product is described. A link between resource files of a product and test cases associated with the product is created. The resource files of a first build of the product are compared with the resource files of a second build of the product. A report that comprises which resource files changed between the first build of the product and the second build of the product is generated. The resource files that have changed and the test cases linked to the changed resource files are displayed. The test cases linked to the changed resource files are executed.

In one embodiment, strings of data may be provided within the resource files of the product. A value may be appended to each of the strings of data. The value may be associated with a filename of the resource file that includes the string of data. In one configuration, the value may be a cyclic redundancy check (CRC) value of the filename of the resource file. A test build of the product may be created with the resource files and the appended strings of data within the resource files.

In one example, a test case may be executed on the test build of the product. The values appended to the strings of data may be recorded. The values appended to the strings of data may be compared to a list of filenames of resource files. The one or more resource files linked to the test case may be determined based on the comparison of the appended values and the list of filenames of the resource files.

A computer system configured to focus product testing based on areas of change within the product is also described. The computer system may include a processor and memory in electronic communication with the processor. The computer system may also include a quality assurance module configured to create a link between resource files of a product and test cases associated with the product, and compare the resource files of a first build of the product with the resource files of a second build of the product. The quality assurance module may also be configured to generate a report that comprises which resource files changed between the first build of the product and the second build of the product, and display the resource files that have changed and the test cases linked to the changed resource files. The quality assurance module may be further configured to execute the test cases linked to the changed resource files.

A computer-program product for focusing product testing based on areas of change within the product is also described. The computer-program product may include a computer-readable medium having instructions thereon. The instructions may include code programmed to create a link between resource files of a product and test cases associated with the product, and code programmed to compare the resource files of a first build of the product with the resource files of a second build of the product. The instructions may also include code programmed to generate a report that comprises which resource files changed between the first build of the product and the second build of the product, and code programmed to display the resource files that have changed and the test cases linked to the changed resource files. In addition, the instructions may include code programmed to execute the test cases linked to the changed resource files.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
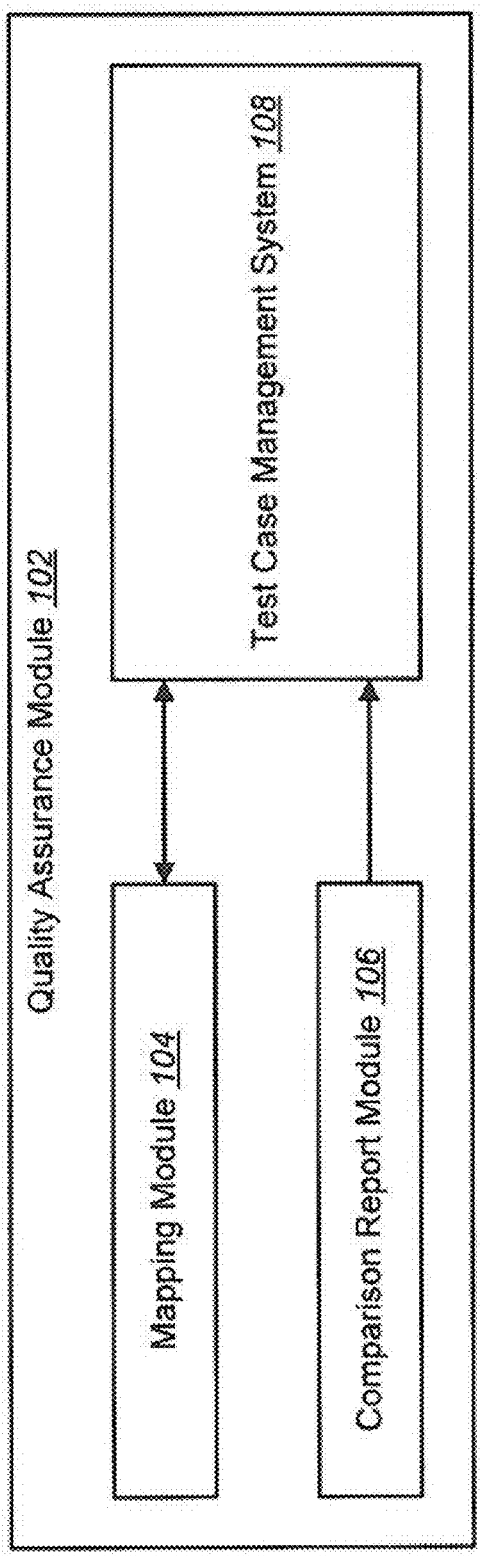
FIG. 1 is a block diagram illustrating one embodiment of a quality assurance module.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The quality assurance life cycle of a product being developed may involve multiple passes and/or phases before the product is ready for use. For example, the life cycle of a localized product may involve multiple passes in each language being tested. During each pass and/or phase of a testing period of a product, various functionalities, such as user interfaces associated with the product, may be tested to ensure that there are no issues or problems introduced between different builds of the product. After the first complete pass of a product, the product may be built again. In some instances, only a certain amount of the product may change between product builds. These changes may be caused by the addition or amendment of certain strings of data in user interfaces. Changes may also occur because of errors that are fixed from one product build to another.

Currently, testing procedures do not determine specific test areas of the product to focus on during each pass based on the change (or delta) between each product build. As a result, full testing of the entire functionality of the product may be required during each test cycle. This may result in an inefficient use of time and/or resources. In addition, time restraints may cause the final product to be tested only on random areas that are perceived to be of high priority. This random testing procedure may or may not test the correct areas of the product that changed between the final product build and the previous product build.

FIG. 1 is a block diagram illustrating one embodiment of a quality assurance module 102. The assurance module 102 may test products to ensure that the functionality of the product is operating correctly.

In one configuration, the assurance module 102 may include a mapping module 104, a comparison report module 106, and a test case management system 108. The mapping module 104 may create a map between product resource files and the test cases associated with these product resource files. In other words, the mapping module 104 may create a link between a product resource file and a test case. In one embodiment, the product resource files may include strings of data that are associated with user interfaces displayed in the product.

The comparison report module 106 may generate an automated file comparison report between subsequent builds of the product. For example, the comparison report module 106 may generate a report that indicates the resource files that changed from one build of the product to a subsequent build of the product. In one embodiment, the comparison report module 106 may push information relating to the product resource files that have changed between builds of the product to the test case management system 108. With this information, the test case management system 108 may generate a report which details the product resource files that have changed between builds of the product. In addition, the test case management system 108 may communicate with the mapping module 104 to determine the test cases that are mapped, or linked, to the resource files that have been changed. In one example, the test case management system 108 may assign test cases to be executed on the current build of the product based on the generated report.

Figure 2:
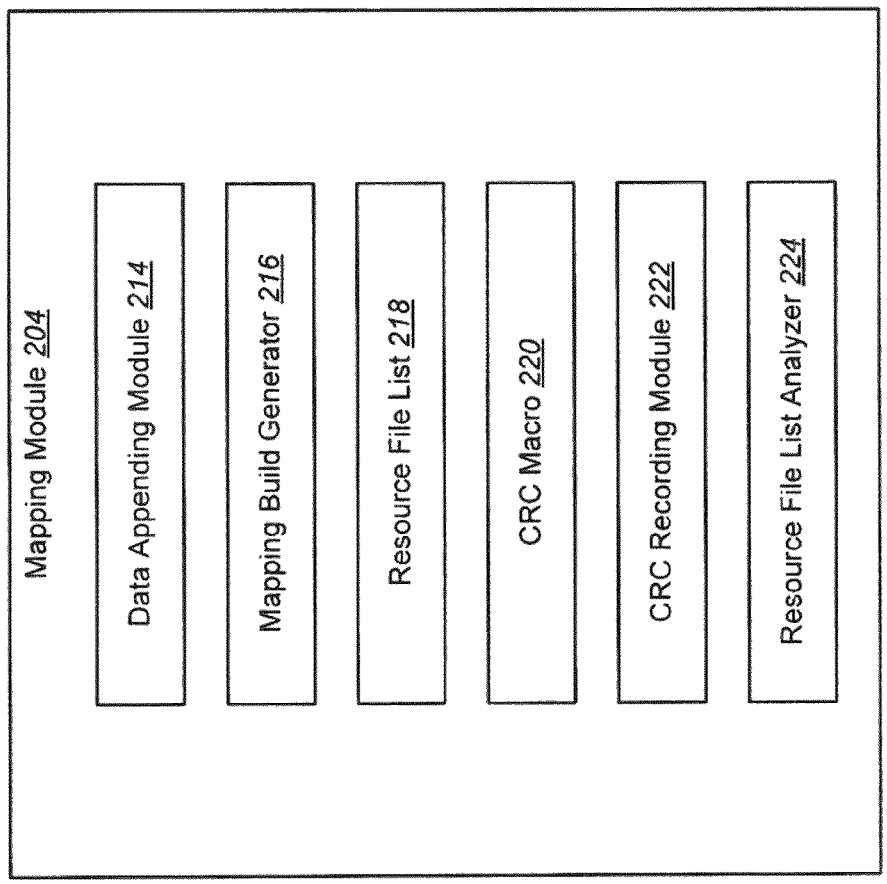
FIG. 2 is a block diagram illustrating a further embodiment of a mapping module.

FIG. 2 is a block diagram illustrating a further embodiment of a mapping module 204. As previously stated, the mapping module may establish a link or map between product resource files of a product and test cases for these files. In one example, the product resource files may include strings of data that are associated with the user interfaces that may be displayed in the product. The mapping module 204 may include a data appending module 214. In one embodiment, the data appending module 214 may append a value to the strings of data in order to identify which strings of data are included in certain product resource files. For example, the data appending module 214 may append a cyclic redundancy check (CRC) value of the filename of a product resource file from which a string of data belongs. As a result, each string of data may be appended with the CRC value that is associated with the resource file that contains that particular string of data.

The mapping module 204 may also include a mapping build generator 216. The build generator 216 may create a special build of the product that may be similar to a pseudo build of the product. In one example, for a localized product, the mapping build generator 216 may build the special product build, which is similar to a mock translated build of the product. This special product build for a localized product may be created from the English product build. The mapping module 204 may also include a resource file list 218. In one configuration, the resource file list 218 may be a spreadsheet which lists all of the resource files for a product. In addition, the mapping module 204 may include a CRC macro 220 that may generate and display the CRC values of the filenames for each of the resource files for the product. As previously stated, the CRC value of a particular resource file may be appended to strings of data that are included within this particular product resource file.

The mapping module 204 may further include a CRC recording module 222. In one example, a test case may be executed on the special build of the product. The test case may trigger a certain action to occur within the special build of the product. One or more strings of data may be involved with this triggered action. The recording module 222 may record each of the CRC values appended to each string of data involved with the action. A resource file list analyzer 224 may analyze the recorded values appended to the strings of data and cross-check the resource file list 218 in order to determine the corresponding filenames of the resource files associated with each of the recorded CRC values. As a result, a link may be established between each product resource file and a test case.

Figure 3:
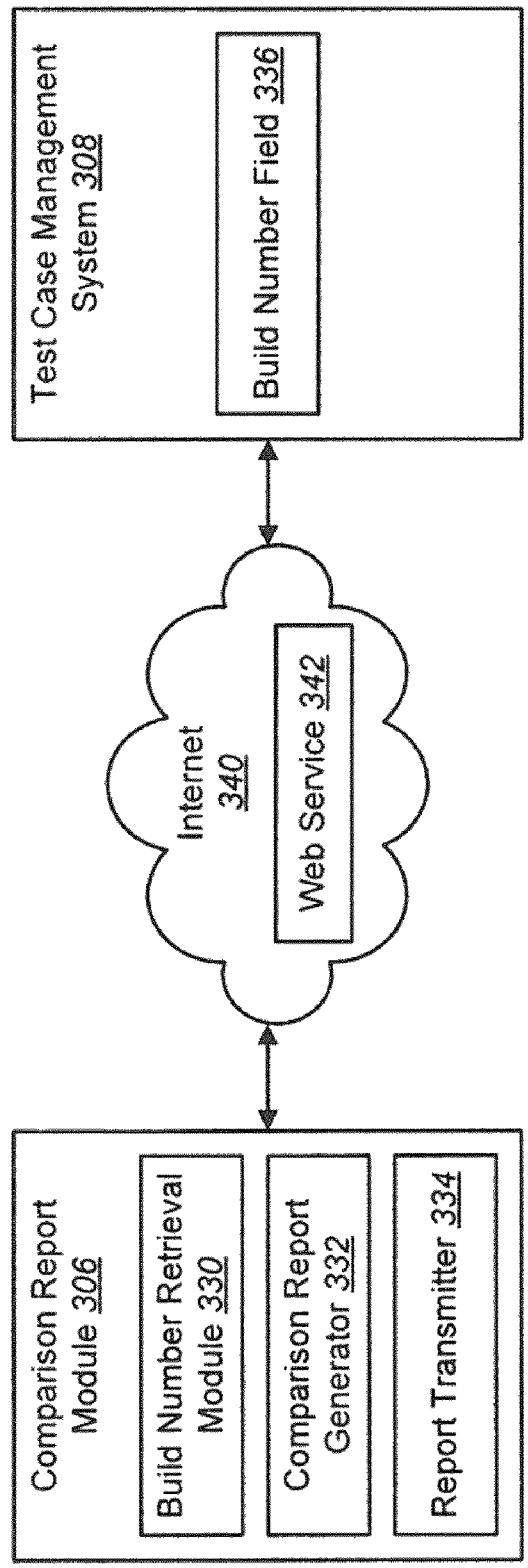
FIG. 3 is a block diagram illustrating a further embodiment of a comparison report module communicating with a test case management system across the internet network.

FIG. 3 is a block diagram illustrating a further embodiment of a comparison report module 306. The report module 306 may communicate with a test case management system 308 across a network, such as the Internet 340. In one embodiment, the comparison report module 306 may include a build number retrieval module 330, a comparison report generator 332, and a report transmitter 334. The test case management system 308 may include a build number filed 336. In one embodiment, the build number field 336 may be a data field where the current build number of a product currently under test may be set. The build number retrieval module 330 may automatically retrieve the current build number indicated in the build number field 336 from the test case management system 308.

In one embodiment, the comparison report generator 332 may generate a report that details the product resource files that have been added, changed, and/or deleted between the previous product build and the current product build. This report may be sent to the test case management system 308 via the report transmitter 334. In one embodiment, the report transmitter 334 may transmit the report through a web service 342 on the Internet 340. The process of retrieving the build number and generating a comparison report may be an automated process that is executed each time a new build of the product is created.

Figure 4:
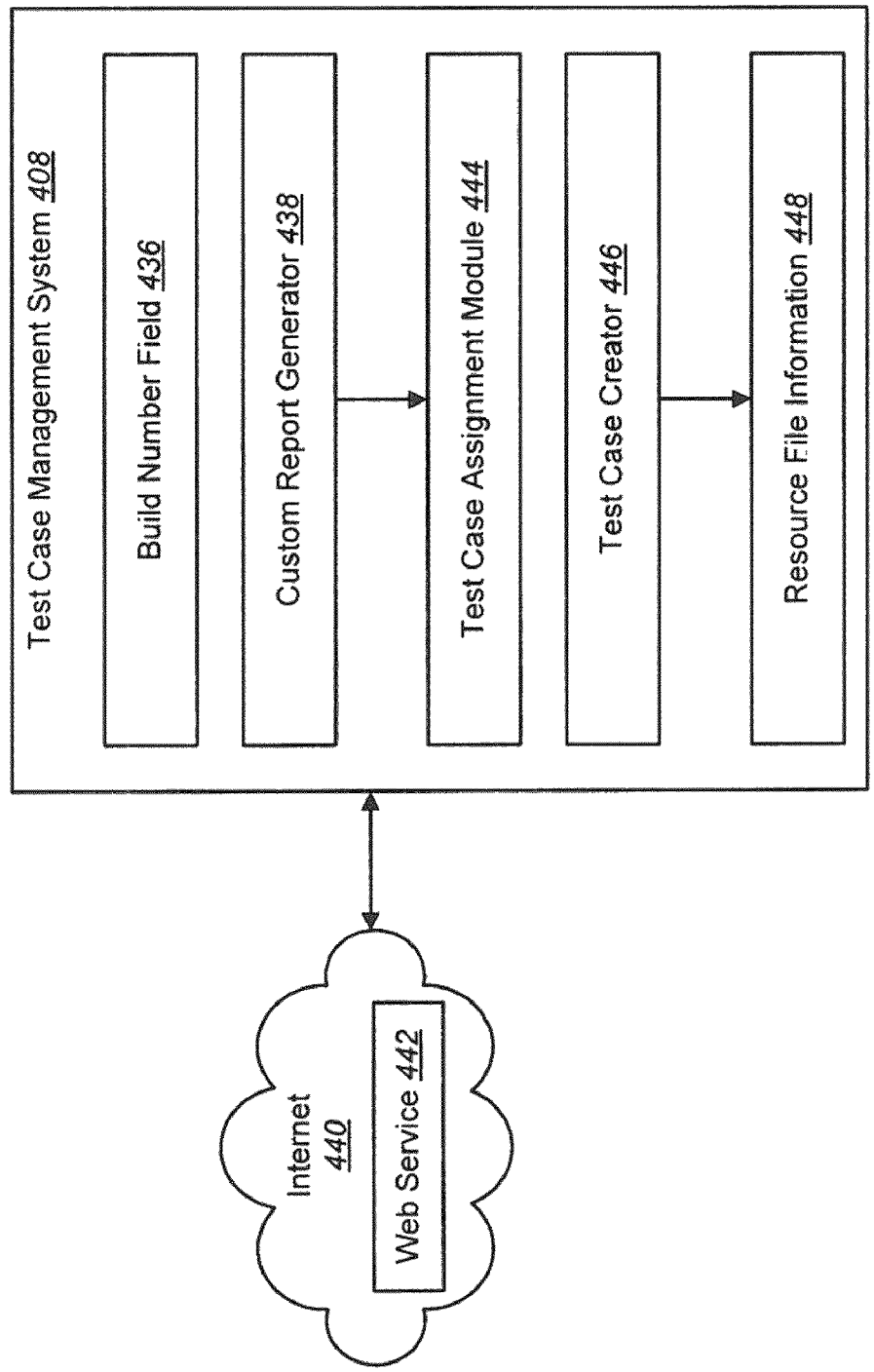
FIG. 4 is a block diagram illustrating a further embodiment of a test case management system.

FIG. 4 is a block diagram illustrating a further embodiment of a test case management system 408. As previously stated, the test case management system 408 may include a build number field 436 that may indicate the current build number of a product that is currently under test. The test case management system 408 may also include a custom report generator 438. The custom report generator 438 may generate and display a custom report that lists each of the product resource files that have been changed between selected builds of the product. The custom report generator 438 may receive information to generate this report via a web service 442 on the Internet. The custom report generator 438 may also display the test cases that are linked to the product resource files identified in the custom report. In one embodiment, a test case assignment module 444 may assign the test cases listed in the report to be executed in order to validate the areas of the product that have changed from the previous build of the product.

In one embodiment, details of each of the product resource files of the product may be uploaded and stored to the test case management system 408 via the web service 442. The test case management system 408 may include a test case creator 446. The creator 446 may be used to create or edit a test case. The creator 446 may access the uploaded resource file information 448 that was received via the web service 442. As a result, when a user creates or edits a test case using the test case creator 446, the user may browse a list of product resource files stored on the test case management system as the resource file information 448. The user may add or link one or more resource product files to the newly created and/or edited test case.

Figure 5:
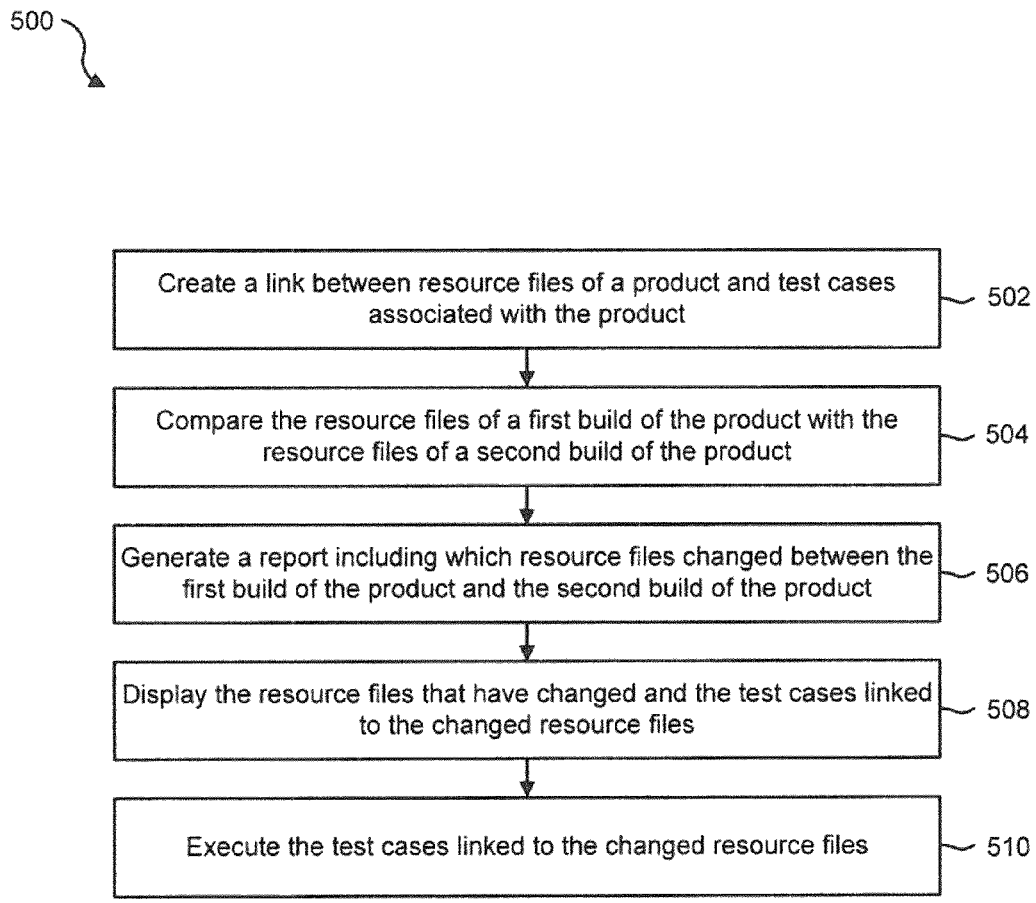
FIG. 5 is a flow diagram illustrating one embodiment of a method for focusing product testing based on areas of change within the product.

FIG. 5 is a flow diagram illustrating one embodiment of a method 500 for focusing product testing based on areas of change within the product. In one embodiment, the method 500 may be implemented by the quality assurance module 102.

In one configuration, a link between resource files of a product and test cases associated with the product may be created 502. In other words, each resource file of the product may be linked or mapped to a particular test case associated with the product. The resource files of a first build of the product may be compared 504 with the resource files of a second build of the product. In one configuration, the second build of the product may be subsequent to the first build of the product.

In one example, a report may be generated 506 that includes the resource files that changed between the first build of the product and the second build of the product. The resource files that changed and the test cases linked to these changed resource files may be displayed 508. Test cases linked to the changed resource files may be assigned to be executed 510. As a result, test case are executed on product resource files that have changed from one product build to another product build. In one embodiment, only areas of the product that undergo a change from one build to another build are tested on a subsequent test pass or test phase.

Figure 6:
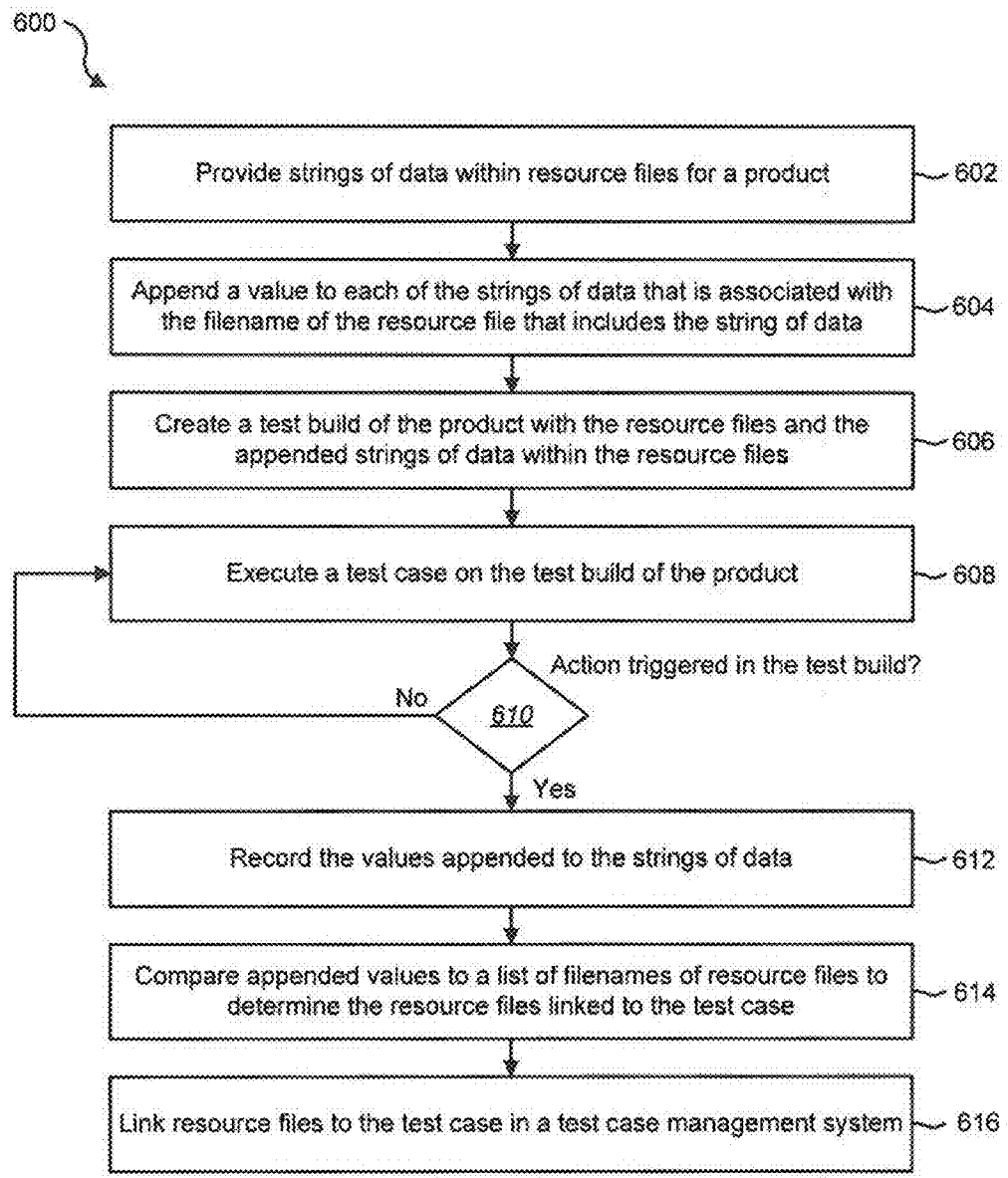
FIG. 6 is a flow diagram illustrating one embodiment of a method for mapping product resource files to test cases.

FIG. 6 is a flow diagram illustrating one embodiment of mapping (or linking) product resource files to test cases. The method 600 may be implemented by the quality assurance module 102. In particular, the method 600 may be implemented by the mapping module 104.

Strings of data within resource files for a product may be provided 602. The strings of data may be associated with user interfaces displayed in the product. In one embodiment, a value may be appended 604 to each of the strings of data. Each value appended to a string of data may be associated with the filename of the resource file that includes that particular string of data. In one embodiment, the value may be the CRC value of the filename of the resource file.

In one configuration, a test build of the product may be created 606 with the resource files and the appended strings of data within the resource files. A test case may be executed 608 on the test build of the product. In one embodiment, a determination 610 may be made as to whether the executed test case triggered a particular action to occur in the test build. For example, a determination 610 may be made as to whether a new dialogue is triggered in the test build of the product when the test case is executed 608. If it is determined 610 that no action is triggered in the test build, the method 600 may return to execute 608 another test case on the test build of the product. If, however, it is determined 610 that the test case triggers a certain action in the test build, the appended values of the strings of data associated with the triggered action may be recorded 612. In one embodiment, the recorded appended values may be compared 614 to a list of filenames of resource files. The comparison may occur in order to determine the one or more resource files linked to the test case that triggered the action in the test build. As a result, a direct link 616 between product resource files and test cases associated with the product may be established in a test case management system.

Figure 7:
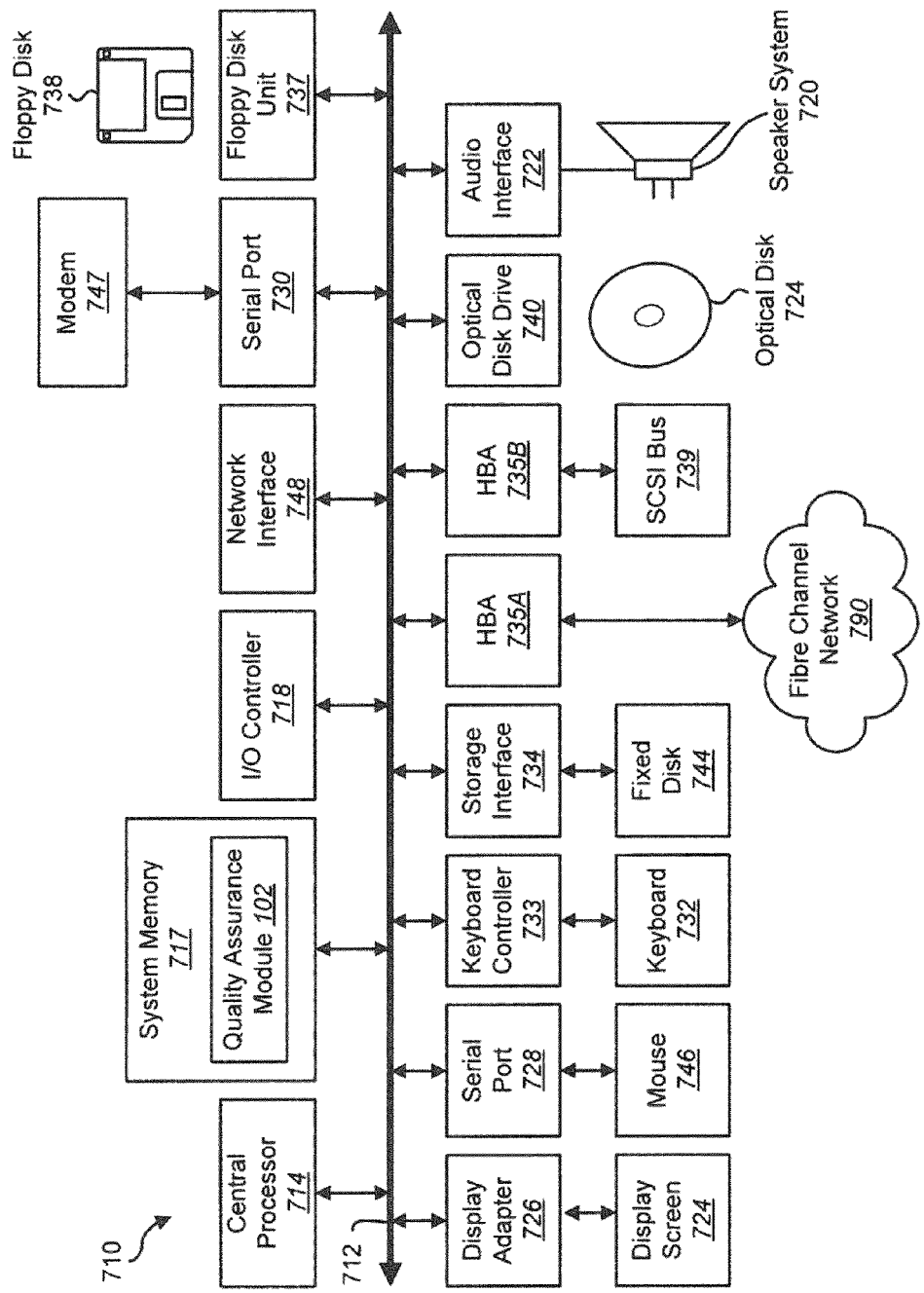
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the quality assurance module 102 to implement the present systems and methods may be stored within the system memory 717. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
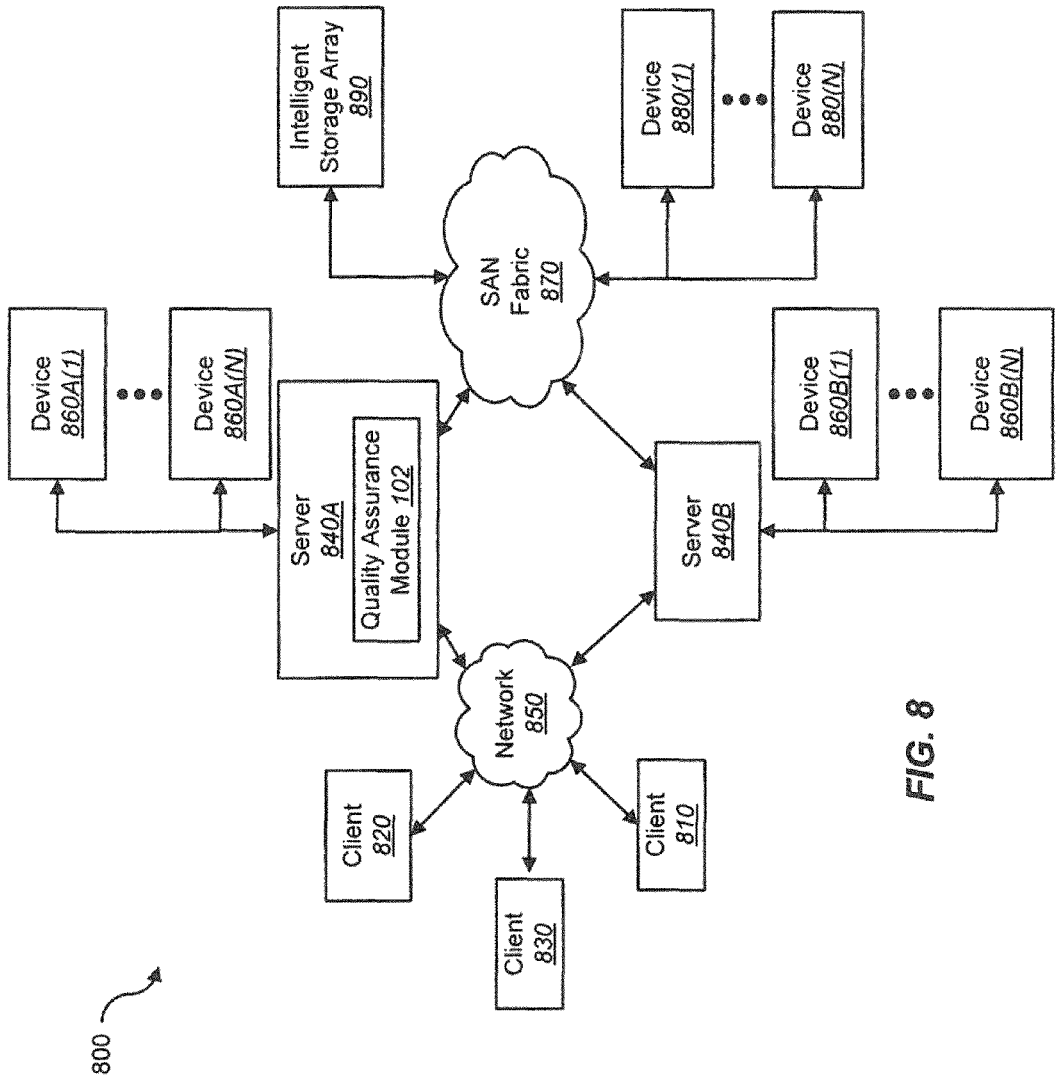
FIG. 8 is a block diagram depicting a network architecture in which client systems, as well as storage servers are coupled to a network.

FIG. 8 is a block diagram depicting a network architecture 800 in which client systems 810, 820 and 830, as well as storage servers 840A and 840B (any of which can be implemented using computer system 810), are coupled to a network 850. In one embodiment, the quality assurance module 102 may be located within a server 840A, 840B to implement the present systems and methods. The storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the disclosure. SAN fabric 870 supports access to storage devices 880(1)-(N) by storage servers 1040A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for focusing product testing based on areas of change within the product, comprising:
    establishing a link between at least one resource file of a product and a test case, wherein establishing the link comprises recording one or more values associated with an action triggered by the test case, determining the resource file associated with each value, and linking each determined resource file to the test case;
    comparing the resource files of a first build of the product with the resource files of a second build of the product;
    generating a report that comprises which resource files changed between the first build of the product and the second build of the product;
    displaying the resource files that have changed and the test cases linked to the changed resource files; and
    limiting an execution of test cases to those test cases that are linked to the changed resource files.

2. The method of claim 1, further comprising providing strings of data within the resource files of the product.

3. The method of claim 2, further comprising appending a value to each of the strings of data, wherein the value is associated with a filename of the resource file that includes the string of data.

4. The method of claim 3, wherein the value comprises a cyclic redundancy check (CRC) value of the filename of the resource file.

5. The method of claim 3, further comprising creating a test build of the product with the resource files and the appended strings of data within the resource files.

6. The method of claim 5, further comprising executing a test case on the test build of the product.

7. The method of claim 6, wherein recording one or more values comprises recording the values appended to the strings of data.

8. The method of claim 7, wherein establishing the link further comprises comparing the values appended to the strings of data to a list of filenames of resource files.

9. The method of claim 8, wherein determining the resource file associated with each value is based on the comparison of the appended values and the list of filenames of the resource files.

10. A computer system configured to focus product testing based on areas of change within the product, comprising:
    a processor;
    memory in electronic communication with the processor;
    instructions being stored in the memory, the instructions being executable by the processor to:
        establish a link between at least one resource file of a product and a test case, wherein the instructions to establish the link comprise instructions executable by the processor to:
            record one or more values associated with an action triggered by the test case,
            determine the resource file associated with each value, and link each determined resource file to the test case;
        compare the resource files of a first build of the product with the resource files of a second build of the product;
        generate a report that comprises which resource files changed between the first build of the product and the second build of the product;
        display the resource files that have changed and the test cases linked to the changed resource files; and
        limit an execution of test cases to those test cases that are linked to the changed resource files.

11. The computer system of claim 10, wherein the resource files of the product include strings of data.

12. The computer system of claim 11, wherein the instructions are executable by the processor to:
    append a value to each of the strings of data, wherein the value is associated with a filename of the resource file that includes the string of data.

13. The computer system of claim 12, wherein the value comprises a cyclic redundancy check (CRC) value of the filename of the resource file.

14. The computer system of claim 12, wherein the instructions are executable by the processor to:
    create a test build of the product with the resource files and the appended strings of data within the resource files.

15. The computer system of claim 14, wherein the instructions are executable by the processor to:
    execute a test case on the test build of the product.

16. The computer system of claim 15, wherein the instructions to record one or more values are executable by the processor to:
    record the values appended to the strings of data.

17. The computer system of claim 16, wherein the instructions to establish a link are executable by the processor to:
    compare the values appended to the strings of data to a list of filenames of resource files.

18. The computer system of claim 17, wherein the instructions to determine the resource file associated with each value are executable to:
    compare of the appended values and the list of filenames of the resource files.

19. A computer-program product for focusing product testing based on areas of change within the product, the computer-program product comprising a non-transitory computer-readable medium having instructions thereon, the instructions being executable by a processor to:
    establish a link between at least one resource file of a product and of a test case, wherein the instructions to establish the link are executable by the processor to:
        record one or more values associated with an action triggered by the test case,
        determine the resource file associated with each value, and
        link each determined resource file to the test case;
    compare the resource files of a first build of the product with the resource files of a second build of the product;
    generate a report that comprises which resource files changed between the first build of the product and the second build of the product;
    display the resource files that have changed and the test cases linked to the changed resource files; and
    limit an execution of test cases to those test cases that are linked to the changed resource files.

20. The computer-program product of claim 19, wherein the resource files of the product include strings of data, wherein the instructions are executable by the processor to append a value to each of the strings of data, and wherein the value is associated with a filename of the resource file that includes the string of data.

* * * * *